United States Patent
Liu

(10) Patent No.: US 12,022,410 B2
(45) Date of Patent: Jun. 25, 2024

(54) METHOD AND DEVICE FOR PROCESSING PHYSICAL BROADCAST CHANNEL

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 452 days.

(21) Appl. No.: 16/608,668

(22) PCT Filed: Apr. 27, 2017

(86) PCT No.: PCT/CN2017/082158
§ 371 (c)(1),
(2) Date: Oct. 25, 2019

(87) PCT Pub. No.: WO2018/141136
PCT Pub. Date: Aug. 9, 2018

(65) Prior Publication Data
US 2021/0360546 A1    Nov. 18, 2021

(51) Int. Cl.
*H04W 56/00* (2009.01)
*H04W 24/08* (2009.01)

(52) U.S. Cl.
CPC ......... *H04W 56/001* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 4,482,926 A | * | 11/1984 | Nishijima | G11B 15/087 360/73.06 |
| 2016/0095076 A1 | | 3/2016 | Xiong et al. | |

(Continued)

FOREIGN PATENT DOCUMENTS

| | | |
|---|---|---|
| CN | 102195705 A | 9/2011 |
| CN | 103402251 A | 11/2013 |

(Continued)

OTHER PUBLICATIONS

International Search Report of International Application No. PCT/CN2017/082158, mailed Jan. 18, 2018.

(Continued)

*Primary Examiner* — Kenny S Lin
*Assistant Examiner* — Rodrick Mak
(74) *Attorney, Agent, or Firm* — Finnegan, Henderson, Farabow, Garrett & Dunner, L.L.P.

(57) ABSTRACT

The present invention relates to a physical broadcast channel processing method and apparatus. The method comprises: according to a preset synchronization signal position, performing synchronization signal identification among obtained subframes; after performing the synchronization signal identification, determining a first synchronization signal block; within a synchronization signal burst set to which the first synchronization signal block belongs, performing synchronization signal identification once again, and determining a second synchronization signal block, performing soft merging on physical broadcast channels (PBCHs) in the first synchronization signal block and the second synchronization signal block. The prevent invention implements PBCH soft merging within a synchronization signal burst set, which helps to increase a PBCH decoding success rate.

4 Claims, 16 Drawing Sheets

(56) References Cited

U.S. PATENT DOCUMENTS

| | | | |
|---|---|---|---|
| 2017/0142741 A1* | 5/2017 | Kaur | H04W 76/14 |
| 2018/0049082 A1* | 2/2018 | Kinthada Venkata | H04W 24/10 |
| 2018/0077660 A1* | 3/2018 | Ly | H04L 5/0048 |
| 2018/0227935 A1* | 8/2018 | Zhou | H04W 72/1205 |
| 2018/0279238 A1* | 9/2018 | Zhou | H04L 5/0048 |
| 2019/0028220 A1* | 1/2019 | Kecicioglu | H04W 56/0015 |
| 2019/0319699 A1* | 10/2019 | Lee | H04B 7/2656 |
| 2020/0100214 A1* | 3/2020 | Wei | H04L 1/0041 |

FOREIGN PATENT DOCUMENTS

| | | | | |
|---|---|---|---|---|
| CN | 104753641 A | | 7/2015 | |
| CN | 105745892 A | | 7/2016 | |
| CN | PCT/CN2017/073951 | * | 1/2017 | H04L 27/26 |
| CN | 106572533 A | | 4/2017 | |
| WO | WO 2016/074629 A1 | | 5/2016 | |
| WO | WO-2019095291 A1 | * | 5/2019 | H04L 5/0023 |

OTHER PUBLICATIONS

First Office Action of Chinese Application No. 201780000486.0, mailed Jun. 3, 2021.

Nokia, Alcatel-Lucent Shanghai Bell, "NR-PBCH Design", 3GPP TSG RAN WG1 Meeting #88, R1-1703094, Athens, Greece, Feb. 13-17, 2017, 8 pages.

Ericsson, "NR physical broadcast physical channel design", 3GPP-TSG RAN WG1 Meeting #88bis, R1-1706011, Spokane, WA, Apr. 3-7, 2017, 4 pages.

* cited by examiner

METHOD AND DEVICE FOR PROCESSING PHYSICAL BROADCAST CHANNEL

CROSS REFERENCE TO RELATED APPLICATIONS

This application is a national phase application based on PCT/CN2017/082158, filed Apr. 27, 2017, the content of which is incorporated herein by reference.

TECHNICAL FIELD

The present disclosure generally relates to communication technology, and more particularly, to a method and a device for processing a physical broadcast channel.

BACKGROUND

In related technologies, a network side omnidirectionally broadcasts a synchronization signal block to a user equipment (UE) side, and broadcasts once per period possibly for 4 periods. The user equipment receives the synchronization signal block, and decodes a physical broadcast channel (PBCH). However, it may not decode the PBCH correctly based on one synchronization signal block, if signal quality is poor. Upon receiving synchronization signal blocks within two periods, the user equipment can soft-combine PBCHs within the two synchronization signal blocks, and then decode the PBCHs, thereby improving the success rate of decoding. Related technologies proposed a beam directed broadcasting for a synchronization signal block. How to decode a PBCH with high quality in a beam direction is an urgent problem to be solved.

SUMMARY

Embodiments of the present disclosure provide a method and a device for processing a physical broadcast channel. The technical solutions are as follows:

According to a first aspect of embodiments of the present disclosure, there is provided a method for processing a physical broadcast channel, comprising:
  identifying a synchronization signal from an obtained subframe according to a preset position of the synchronization signal;
  determining a first synchronization signal block when the synchronization signal is identified;
  determining a second synchronization signal block when another synchronization signal is identified in a synchronization signal burst set to which the first synchronization signal block belongs;
  soft-combining physical broadcast channels (PBCHs) in the first synchronization signal block and in the second synchronization signal block.

The technical solutions provided by the embodiments of the present disclosure can have the following beneficial effects: the present embodiment achieves the soft combining of the PBCHs in the synchronization signal burst set, and contributes to the increasing of the success rate of decoding the PBCHs in the case of the beam directed transmission of the synchronization blocks.

According to a second aspect of the embodiments of the present disclosure, there is provided a device for processing a physical broadcast channel, comprising:
  a processor;
  a memory for storing an instruction executable by the processor,
  wherein the processor is configured to:
  identify a synchronization signal from an obtained subframe according to a preset position of the synchronization signal;
  determine a first synchronization signal block when the synchronization signal is identified;
  determine a second synchronization signal block when another synchronization signal is identified in a synchronization signal burst set to which the first synchronization signal block belongs;
  soft-combine physical broadcast channels (PBCHs) in the first synchronization signal block and the second synchronization signal block.

It is to be understood that both the foregoing general description and the following detailed description are exemplary and explanatory only and cannot be construed as a limit to the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings denote the same or similar elements unless otherwise defined. The implementations set forth in the following description of exemplary embodiments do not represent all implementations consistent with the disclosure. Instead, they are merely examples of apparatuses and methods consistent with aspects related to the disclosure as recited in the appended claims.

In a related technology, a base station (narrow band, NB) omnidirectionally transmits a Synchronization Signal bock (SS block) for 4 times in 4 periods. Two adjacent synchronization signal blocks are separated from each other by one period. When located in a central region of a cell, a user equipment (UE) can receive a signal with good quality. According to one synchronization signal block, the user equipment can successfully decode a physical broadcast channel (PBCH) therein. The user equipment at the margin of the cell may receive a signal with poor quality, and may fail to decode a PBCH in one synchronization signal block. To solve the problem, the user equipment can soft-combine PBCHs of two synchronization signal blocks in two periods, and then decode the soft-combined PBCHs, which improves the success rate of decoding.

Figure 1:
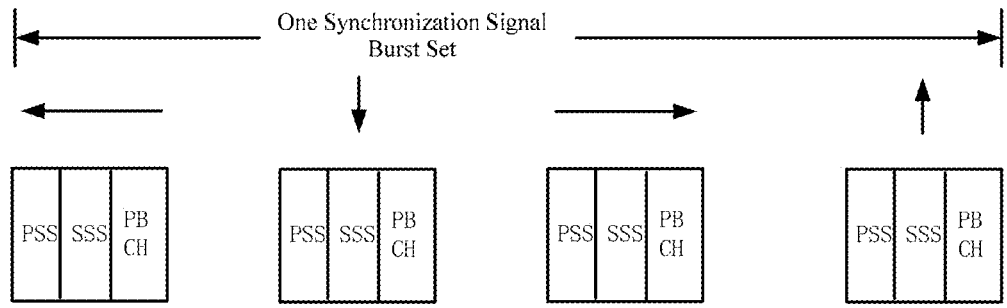
FIG. 1 is a schematic diagram illustrating a synchronization signal block according to an exemplary embodiment.

The related technology proposed beam directed broadcasting of synchronization signal block. The base station transmits a synchronization signal block in one beam direction at a time, and traverses all beam orientations in a Synchronization Signal burst set (SS burst set), namely, transmits a synchronization signal block once in each beam orientation. It is guaranteed that scanning is performed in all beam directions within one synchronization signal burst set, and the network side transmits substantially the same synchronization signal blocks in at least two beam directions within one synchronization signal burst set (broadcast data except beam index information is the same between the two synchronization signal blocks). As illustrated in FIG. 1, the arrow above each synchronization signal block indicates the beam direction. For example, there are four beam directions in FIG. 1. The two adjacent synchronization signal blocks can be close to each other, or can be spaced apart from each other by a distance.

Figure 2:
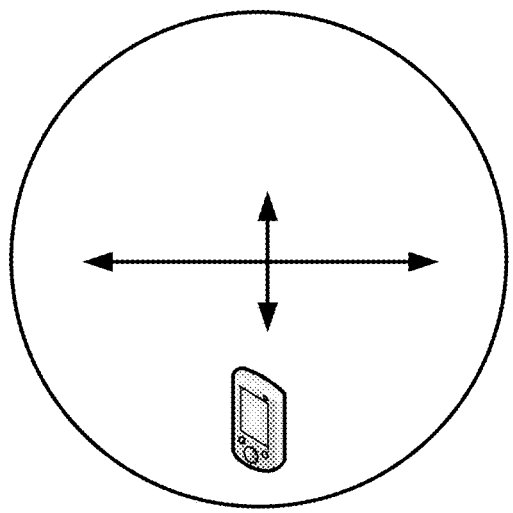
FIG. 2 is a schematic diagram illustrating a position of a user equipment according to an exemplary embodiment.
Figure 3:
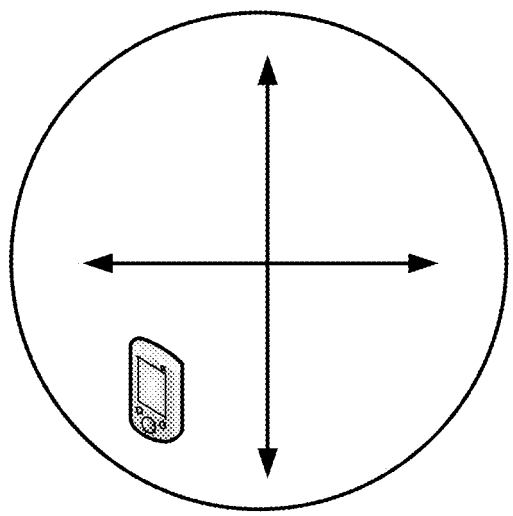
FIG. 3 is a schematic diagram illustrating a position of a user equipment according to an exemplary embodiment.

If the user equipment is located in a positive direction of a beam, as shown in FIG. 2, the user equipment can receive a signal with good quality, and a PBCH can be successfully decoded according to a synchronization signal block in the direction. If the user equipment is located between two beam directions, as illustrated in FIG. 3, the user equipment may receive a signal with poor quality, and a PBCH may not be decoded successfully.

To solve the problem, the embodiment adopts a scheme of soft combining the PBCHs. When synchronization signal blocks are transmitted omnidirectionally, PBCHs of the two synchronization signal blocks in two periods are soft-combined. In case of the beam directed transmission of synchronization signal blocks, two synchronization signal blocks in two periods may be different, so PBCHs in the two synchronization signal blocks in the two periods cannot be soft-combined. The embodiment provides a scheme of soft-combining PBCHs of two synchronization signal blocks within one synchronization signal burst set.

Figure 4:
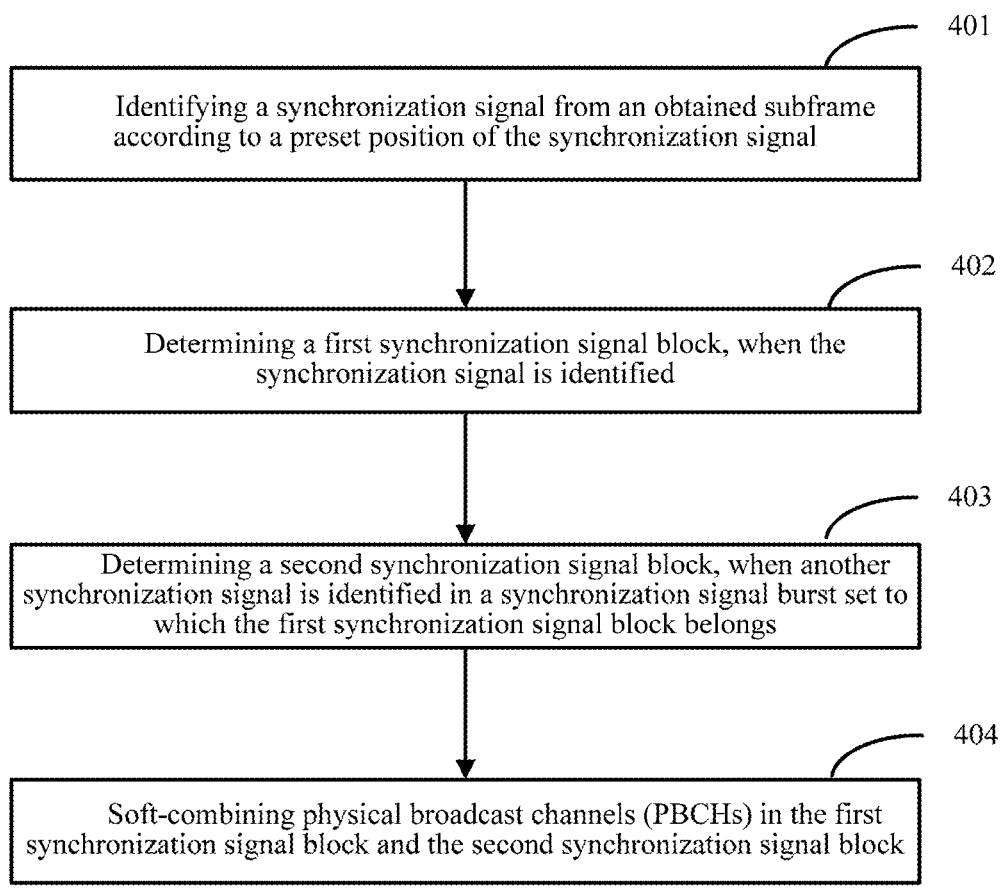
FIG. 4 is a flowchart illustrating a method for processing a physical broadcast channel according to an exemplary embodiment.

FIG. 4 is a flowchart illustrating a method for processing a physical broadcast channel according to an exemplary embodiment. The method for processing a physical broadcast channel is applied to a user equipment, which can be a device having a mobile communication function such as a mobile phone. As illustrated in FIG. 4, it comprises the following steps 401-404.

In step 401, identifying a synchronization signal from an obtained subframe according to a preset position of the synchronization signal.

In step 402, determining a first synchronization signal block when the synchronization signal is identified.

In step 403, when another synchronization signal is identified in a synchronization signal burst set to which the first synchronization signal block belongs, determining a second synchronization signal block.

In step 404, soft-combining physical broadcast channels (PBCHs) in the first synchronization signal block and the second synchronization signal block.

In the embodiment, the first synchronization signal block is determined via the synchronization signal and the second synchronization signal block is determined in the same manner within the same synchronization signal burst set. In the embodiment, two synchronization signal blocks are determined within the same synchronization signal burst set, so that the PBCHs in the two synchronization signal blocks within the same synchronization signal burst set are soft-combined, which improves the success of decoding the PBCHs by the user equipment. Of course, PBCHs in three or more synchronization signal blocks within the same synchronization signal burst set can also be soft-combined, so as to improve the success of decoding the PBCHs.

In the embodiment, after power on (or restarted etc.), the user equipment can determine two synchronization signal blocks in the same synchronization signal burst set immediately, and soft combining of the PBCHs, which improves the success of decoding the PBCHs, and reduces time delay.

In the embodiment, immediately after power on, the user equipment can determine two synchronization signal blocks in the same synchronization signal burst set, and separately decodes them; and meanwhile, the user equipment soft combine PBCHs of the two synchronization signal blocks and decodes them. If one of them is successfully decoded, data on the PBCH can be obtained. The simultaneous implementation of multiple decoding schemes improves the success of decoding the PBCHs and reduces time delay.

In the embodiment, there are many implementations for the soft combining, for example, bit soft information in the PBCHs in the first synchronization signal block and the second synchronization signal block are added and then are averaged according to corresponding bit positions. Other soft combining algorithms are also applicable to the embodiment.

In the embodiment, the synchronization signal comprises a primary synchronization signal (PSS) and a secondary synchronization signal (SSS), and after positions of the primary synchronization signal and the secondary synchronization signal are determined, a synchronization signal block can be located.

In the embodiment, a system can configure the positions of the synchronization signals in a predetermined manner, for example, the position of the primary synchronization signal is at the $3^{rd}$ symbol (Orthogonal Frequency Division Multiplex (OFDM) symbol) and/or the $7^{th}$ symbol in the subframe while the position of the secondary synchronization signal is at the $5^{th}$ symbol and/or the $9^{th}$ symbol in the subframe.

In an embodiment, the step 403 comprises steps A1-A2.

In step A1, another synchronization signal is identified backwardly from the first synchronization signal block.

In step A2, when another synchronization signal is identified, the second synchronization signal block is determined.

In the embodiment, after power on, the user equipment starts the identification of a synchronization signal from forward to backward, starting from a first subframe that is obtained, and when a first synchronization signal is identified, a first synchronization signal block can be determined. Another synchronization signal is identified backwardly, and when another synchronization signal is identified, a second synchronization signal block can be determined. In the embodiment, the processing is performed immediately after the user equipment is powered on, which leads to a shorter time delay.

In an embodiment, the step 401 comprises steps B1-B2.

In step B1, subframes with a preset duration are received and buffered; the preset duration is less than one period.

In step B2, a synchronization signal is identified forwardly from an end position of the last subframe that is buffered according to a preset position of the synchronization signal.

The step 403 comprises steps B3-B4.

In step B3, in the buffered subframes, another synchronization signal is identified forwardly from the first synchronization signal block.

In step B4, when another synchronization signal is identified, a second synchronization signal block can be determined.

In the embodiment, after powered on, the user equipment first receives and buffers subframes with a preset duration. For example, one period is 20 ms and the preset duration is 10 ms. After subframes of 10 ms are buffered, a synchronization signal is identified forwardly, starting from an end position of the last subframe that is buffered. Namely, the synchronization signal is identified forwardly from the end position of the subframe corresponding to the $10^{th}$ ms. When a first synchronization signal is identified, a first synchronization signal block can be determined. The forward identification of another synchronization signal continues, and when another synchronization signal is identified, a second synchronization signal block can be determined.

The second synchronization signal block can be regarded as the first synchronization signal block, and it is continued to determine a third synchronization signal block (as the second synchronization signal block) forwardly, if it fails to soft-combine and decode PBCHs of the first and second synchronization signal blocks. PBCHs of the second and third synchronization signal blocks are soft combined and decoded until the PBCHs are successfully decoded or there is no synchronization signal block any more.

When the first synchronization signal is identified forwardly, receiving and buffering of a subframe can continue. A synchronization signal will be identified backwardly, starting from the first synchronization signal block, if no synchronization signal is identified forwardly, or it fails to soft-combine and decode PBCHs of the first and second synchronization signal blocks.

In an embodiment, the method further comprises step C.

In step C, the soft-combined PBCHs are decoded.

In an embodiment, the method further comprises steps D1-D4.

In step D1, when the decoding of the soft-combined PBCHs fails, subframes of one period is received and buffered, starting from the first synchronization signal block.

In step D2, a third synchronization signal block spaced apart from the first synchronization signal block by one period is determined.

In step D3, in the subframes of one period that is buffered, a fourth synchronization signal block is acquired forwardly from the third synchronization signal block in a synchronization signal burst set to which the third synchronization signal block belongs.

In step D4, PBCHs in the third synchronization signal block and the fourth synchronization signal block are soft-combined.

In the embodiment, the first and second synchronization signal blocks are subjected to PBCH soft combining and then decoding, but the decoding may fail, which means that the first and second synchronization signal blocks are not in the same synchronization signal burst set. If the second synchronization signal block determined before the decoding failure is determined by the user equipment backwardly from the first synchronization signal block, after the decoding failure, the PBCH soft combining and decoding can be attempted again with the second synchronization signal block determined forwardly from the first synchronization signal block if the user equipment buffers a subframe prior to a position of the first synchronization signal block. If the user equipment does not buffer a subframe prior to the position of the first synchronization signal block, the user equipment should look up backwardly a third synchronization signal block spaced apart from the first synchronization signal block by one period. Since the third synchronization signal block is spaced apart from the first synchronization signal block by one period, it is easy to determine the third synchronization signal block, without identifying a synchronization signal symbol by symbol. Since the second synchronization signal block that is previously looked up backwardly and determined and the first synchronization signal block are not in the same synchronization signal burst set, the fourth synchronization signal block is acquired forwardly from the third synchronization signal block when it is determined. The fourth synchronization signal block thus determined and the third synchronization signal block are in the same synchronization signal burst set, which helps to improve the success of PBCH decoding.

In an embodiment, the method further comprises step E.

In step E, when the decoding of the soft-combined PBCHs is successful, the same portion of data is acquired from the PBCHs of the first synchronization signal block and the second synchronization signal block.

In the embodiment, in the PBCHs of the first synchronization signal block and the second synchronization signal block, system information such as a beam index and a sequence number are different, but a portion of user data are the same, so the same portion of data is acquired while the rest portion of data can be discarded. The user equipment can select any one of the first synchronization signal block and the second synchronization signal block to locate its own position, so to be synchronized with the system. For example, the user equipment selects the synchronization signal block having greater signal intensity from the first synchronization signal block and the second synchronization signal block to locate its own position.

In an embodiment, when another synchronization signal is identified, before the second synchronization signal block is determined, the method further comprises steps F1-F2.

In step F1, current signal intensity is obtained.

In step F2, it is judged whether the signal intensity is greater than a preset signal intensity threshold.

The step 403 comprises step F3.

In step F3, when the signal intensity is not greater than the preset signal intensity threshold and another synchronization signal is identified, a second synchronization signal block is determined.

In the embodiment, if the user equipment adopts a soft combining scheme every time, there will be large power consumption. Therefore, in the embodiment, it can be firstly judged whether the current signal intensity is greater than the preset signal intensity threshold. If the current signal intensity is greater than the preset signal intensity threshold, it means that the signal quality is good and the success rate of PBCH decoding is high, so that a PBCH in a single synchronization signal block can be decoded without using the soft-combining scheme. If the current signal intensity is not greater than the preset signal intensity threshold, it means that the signal quality is poor and the success rate of PBCH decoding is low, so that the soft-combining scheme is required.

If the user equipment does not travel a very large distance, but basically stays at one place, whether or not to adopt the soft combining scheme this time is determined by determining whether the soft combining scheme is employed last time. If the soft combining scheme was adopted last time, the soft combining scheme will be also adopted this time. If the soft combining scheme was not used last time, the soft combining scheme will not be used this time.

In an embodiment, when another synchronization signal is identified, before the second synchronization signal block is determined, the method further comprises steps G1-G2.

In step G1, a PBCH position in the first synchronization signal block is determined according to the position of the synchronization signal in the first synchronization signal block and a preset relative position relationship between the PBCH and the synchronization signal.

In step G2, the PBCH in the first synchronization signal block is decoded according to the PBCH position.

When another synchronization signal is identified, determining a second synchronization signal block comprises step G3.

In step G3, when the PBCH in the first synchronization signal block is unsuccessfully decoded, and when another synchronization signal is identified, the second synchronization signal block is determined.

In the embodiment, the position of the synchronization signal is fixed and the relative position relationship between the synchronization signal and the PBCH in the same synchronization signal block is also fixed. For example, the symbol following the synchronization signal in the same synchronization signal block is the PBCH. After the position of the PBCH is determined, the PBCH can be decoded. If the decoding fails, it indicates that the signal quality is poor and the soft-combining scheme is required, and when another synchronization signal is identified, the second synchronization signal block is determined. In the embodiment, the soft combining scheme is not necessarily employed every time and the scheme of decoding the PBCH in the single synchronization signal block can be comprised, which helps to reduce time delay and increase the success rate of decoding.

The processing of the physical broadcast channel will be described in detail below with reference to several embodiments.

Figure 5:
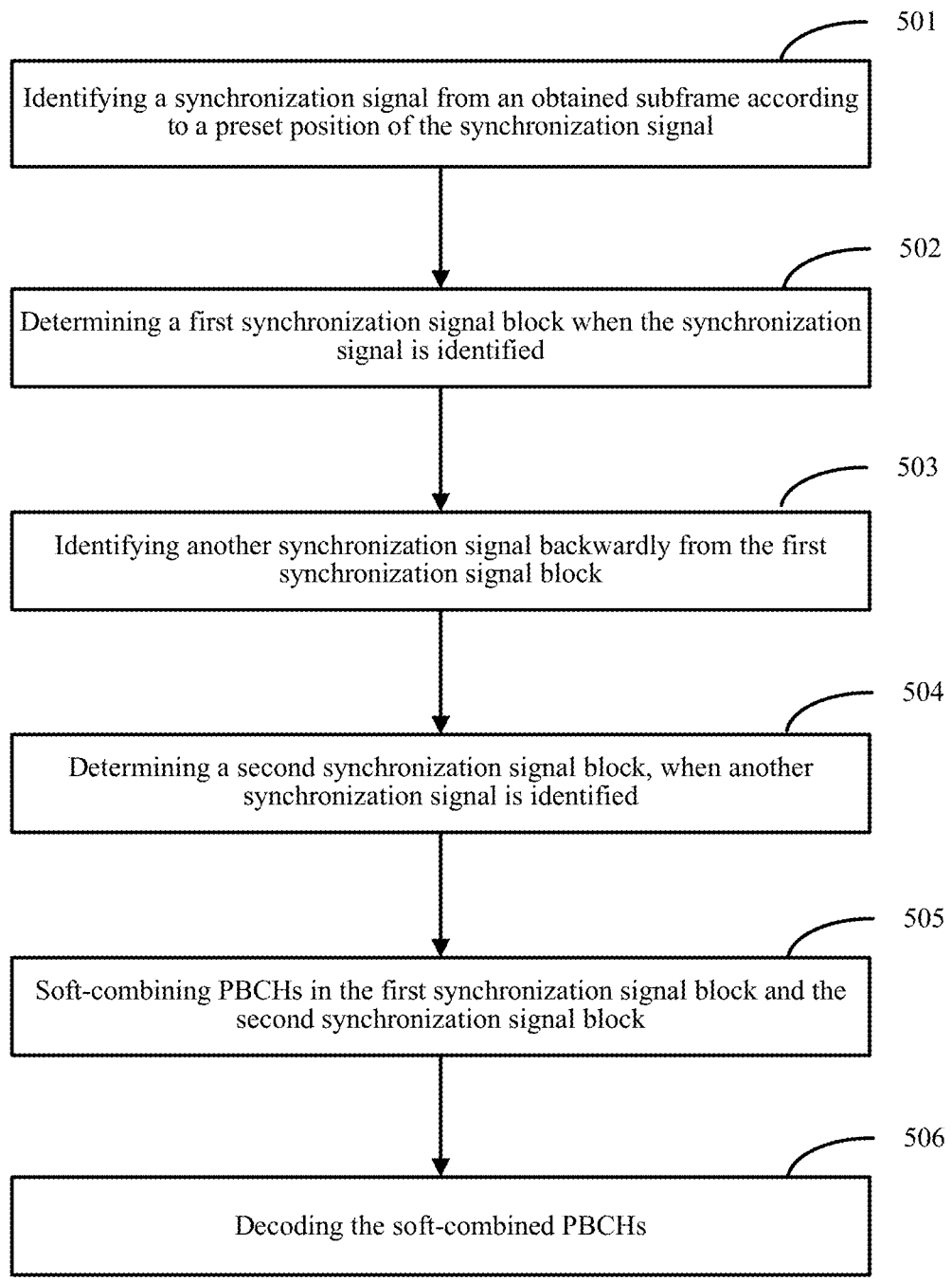
FIG. 5 is a flowchart illustrating a method for processing a physical broadcast channel according to an exemplary embodiment.

FIG. 5 is a flowchart illustrating a method for processing a physical broadcast channel according to an exemplary embodiment. The method for processing the physical broadcast channel is applied to a user equipment, which can be a device having a mobile communication function such as a mobile phone. As illustrated in FIG. 5, the method comprises the following steps 501-506.

In step 501, a synchronization signal is identified from an obtained subframe according to a preset position of the synchronization signal.

In step 502, when the synchronization signal is identified, a first synchronization signal block is determined.

In step 503, another synchronization signal is identified backwardly from the first synchronization signal block.

In step 504, when another synchronization signal is identified, a second synchronization signal block is determined.

In step 505, PBCHs in the first synchronization signal block and the second synchronization signal block are soft-combined.

In step 506, the soft combined PBCHs are decoded.

Figure 6:
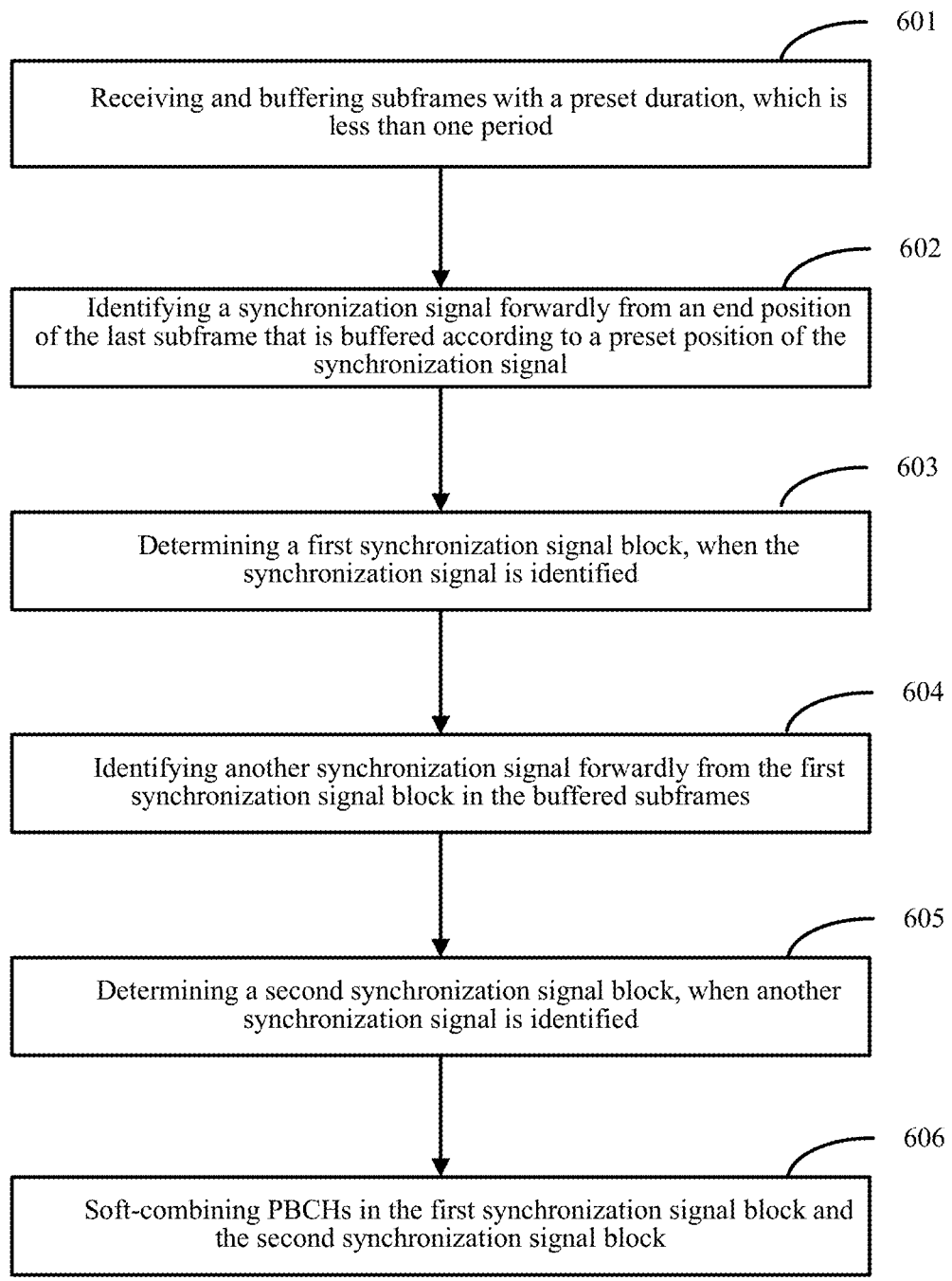
FIG. 6 is a flowchart illustrating a method for processing a physical broadcast channel according to an exemplary embodiment.

FIG. 6 is a flowchart illustrating a method for processing a physical broadcast channel according to an exemplary embodiment. The method for processing the physical broadcast channel is applied to a user equipment, which can be a device having a mobile communication function such as a mobile phone. As illustrated in FIG. 6, it comprises the following steps 601-606.

In step 601, subframes with a preset duration are received and buffered; the preset duration is less than one period.

In step 602, a synchronization signal is identified forwardly from an end position of the last subframe that is buffered according to a preset position of the synchronization signal.

In step 603, when the synchronization signal is identified, a first synchronization signal block will be determined.

In step 604, in the buffered subframes, another synchronization signal is identified forwardly from the first synchronization signal block.

In step 605, when another synchronization signal is identified, a second synchronization signal block will be determined.

In step 606, PBCHs in the first synchronization signal block and the second synchronization signal block are soft-combined.

Figure 7:
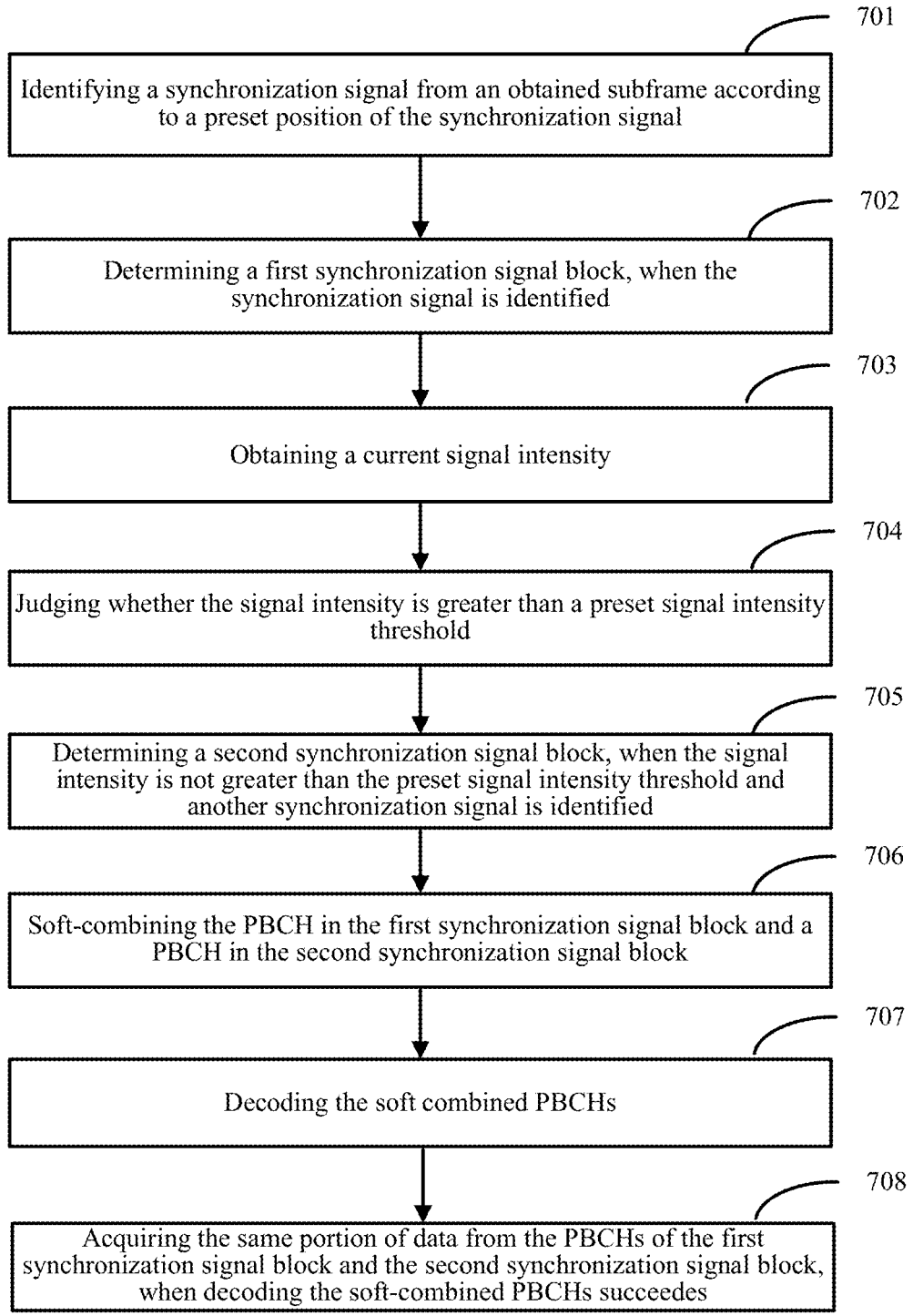
FIG. 7 is a flowchart illustrating a method for processing a physical broadcast channel according to an exemplary embodiment.

FIG. 7 is a flowchart illustrating a method for processing a physical broadcast channel according to an exemplary embodiment. The method for processing the physical broadcast channel is applied to a user equipment, which can be a device having a mobile communication function such as a mobile phone. As illustrated in FIG. 7, it comprises the following steps 701-708.

In step 701, a synchronization signal is identified from an obtained subframe according to a preset position of the synchronization signal.

In step 702, when the synchronization signal is identified, a first synchronization signal block will be determined.

In step 703, current signal intensity is obtained.

In step 704, it is judged whether the signal intensity is greater than a preset signal intensity threshold.

The steps 701 and 702 are two separate procedures independent from the steps 703 and 704, and they are not performed in a strict order.

When the signal intensity is greater than the preset signal intensity threshold, a PBCH in the first synchronization signal block is decoded.

In step 705, when the signal intensity is not greater than the preset signal intensity threshold and another synchronization signal is identified, a second synchronization signal block will be determined.

In step 706, the PBCH in the first synchronization signal block and a PBCH in the second synchronization signal block are soft-combined.

In step 707, the soft-combined PBCHs are decoded.

In step 708, when the soft-combined PBCHs are successfully decoded, the same portion of data is acquired from the PBCHs of the first synchronization signal block and the second synchronization signal block.

When the decoding of the soft-combined PBCHs fails, the procedure can be ended and a first synchronization signal block is re-determined from the first step.

Figure 8:
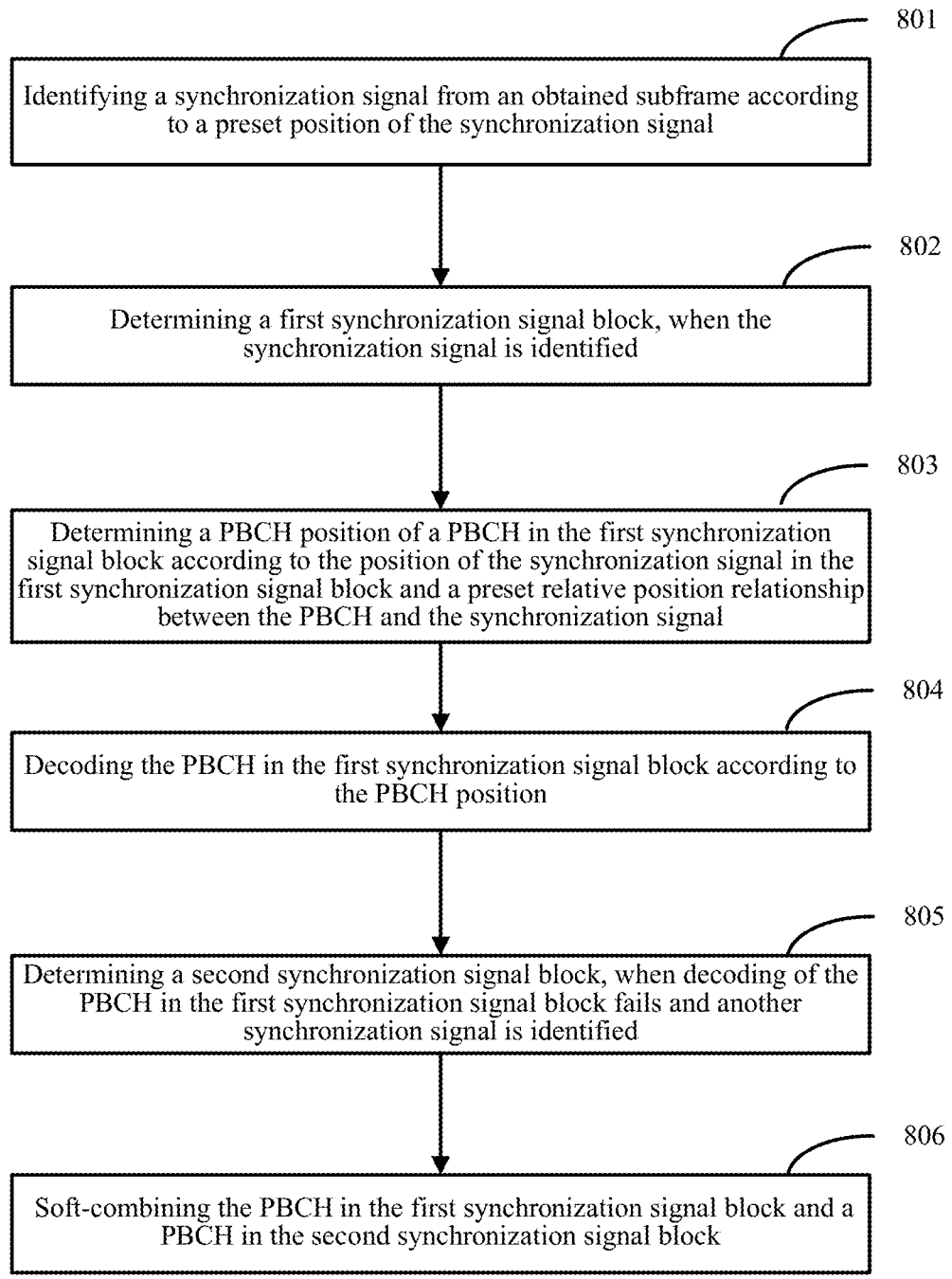
FIG. 8 is a flowchart illustrating a method for processing a physical broadcast channel according to an exemplary embodiment.

FIG. 8 is a flowchart illustrating a method for processing a physical broadcast channel according to an exemplary embodiment. The method for processing the physical broadcast channel is applied to a user equipment, which can be a device having a mobile communication function such as a mobile phone. As illustrated in FIG. 8, it comprises the following steps 801-806.

In step 801, a synchronization signal is identified from an obtained subframe according to a preset position of the synchronization signal.

In step 802, when the synchronization signal is identified, a first synchronization signal block will be determined.

In step 803, a PBCH position in the first synchronization signal block is determined according to the position of the synchronization signal in the first synchronization signal block and a preset relative position relationship between the PBCH and the synchronization signal.

In step 804, the PBCH in the first synchronization signal block is decoded according to the PBCH position.

When the PBCH in the first synchronization signal block is successfully decoded, the procedure is ended.

In step 805, when the PBCH in the first synchronization signal block is unsuccessfully decoded and another synchronization signal is identified, a second synchronization signal block is determined.

In step 806, the PBCH in the first synchronization signal block and a PBCH in the second synchronization signal block are soft-combined.

Figure 9:
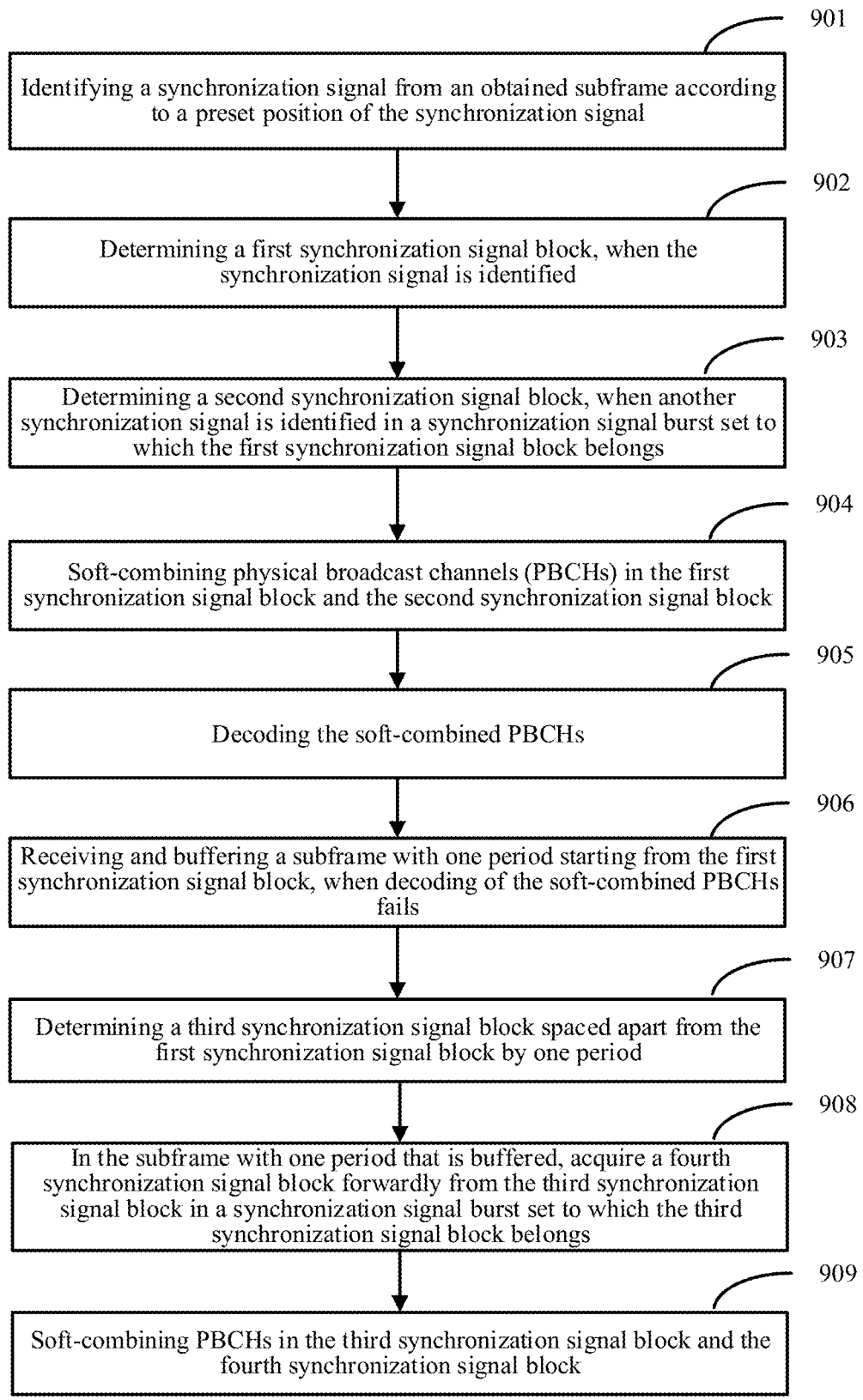
FIG. 9 is a flowchart illustrating a method of processing a physical broadcast channel according to an exemplary embodiment.

FIG. 9 is a flowchart illustrating a method for processing a physical broadcast channel according to an exemplary embodiment. The method for processing the physical broadcast channel is applied to a user equipment, which can be a device having a mobile communication function such as a mobile phone. As illustrated in FIG. 9, it comprises the following steps 901-904.

In step 901, a synchronization signal is identified from an obtained subframe according to a preset position of the synchronization signal.

In step 902, when the synchronization signal is identified, a first synchronization signal block is determined.

In step 903, when another synchronization signal is identified in a synchronization signal burst set to which the first synchronization signal block belongs, a second synchronization signal block is determined.

In step 904, physical broadcast channels (PBCHs) in the first synchronization signal block and the second synchronization signal block are soft-combined.

In step 905, the soft-combined PBCHs are decoded.

When the soft-combined PBCHs are successfully decoded, the same portion of data is obtained from the PBCHs in the first synchronization signal block and the second synchronization signal block.

In step 906, when failing to decode the soft-combined PBCHs, subframes of one period is received and buffered from the first synchronization signal block.

In step 907, a third synchronization signal block spaced apart from the first synchronization signal block by one period is determined.

In step 908, in the subframes of one period that is buffered, a fourth synchronization signal block is acquired forwardly from the third synchronization signal block in a synchronization signal burst set to which the third synchronization signal block belongs.

In step 909, PBCHs in the third synchronization signal block and the fourth synchronization signal block are soft-combined.

The above embodiments can be combined based on actual requirements.

Hereinafter, embodiments of devices according to the present disclosure, which can carry out the method embodiments of the present disclosure, will be described.

Figure 10:
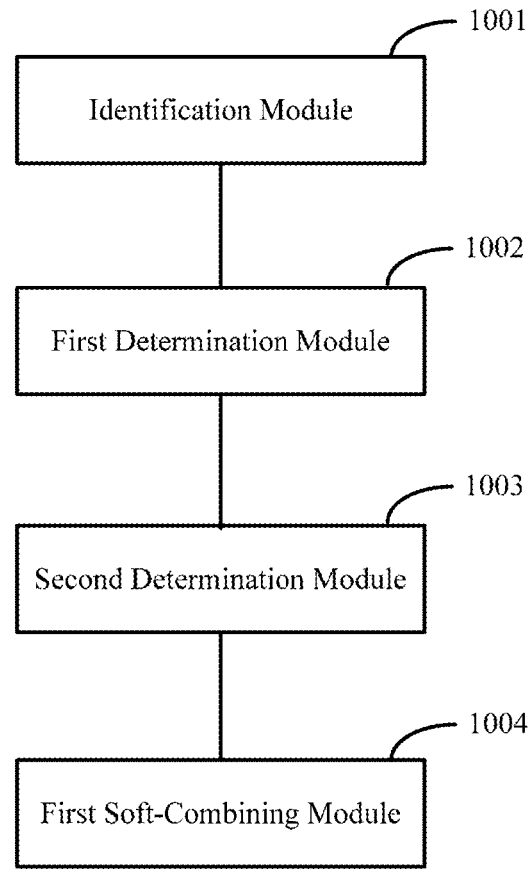
FIG. 10 is a block diagram of a device for processing a physical broadcast channel according to an exemplary embodiment.

FIG. 10 is a block diagram illustrating a device for processing a physical broadcast channel according to an exemplary embodiment, which can be implemented as a part or entirety of an electronic device by software, hardware, or a combination thereof. Referring to FIG. 10, the device comprises an identification module 1001, a first determination module 1002, a second determination module 1003 and a first soft-combining module 1004.

The identification module 1001 is configured to identify a synchronization signal from an obtained subframe according to a preset position of the synchronization signal.

The first determination module 1002 is configured to determine a first synchronization signal block when the synchronization signal is identified.

The second determination module 1003 is configured to determine a second synchronization signal block when another synchronization signal is identified in a synchronization signal burst set to which the first synchronization signal block belongs.

The first soft-combining module 1004 is configured to soft-combine physical broadcast channels (PBCHs) in the first synchronization signal block and the second synchronization signal block.

Figure 11:
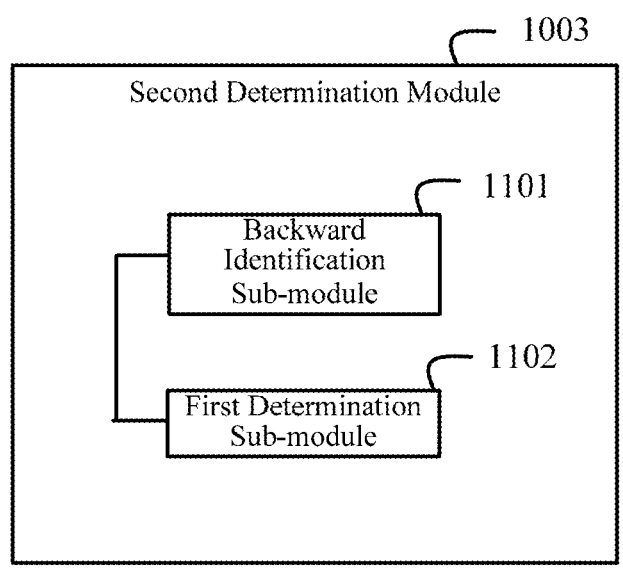
FIG. 11 is a block diagram of a second determination module according to an exemplary embodiment.

In an embodiment, as illustrated in FIG. 11, the second determination module 1003 comprises a backward identification sub-module 1101 and a first determination sub-module 1102.

The backward identification sub-module 1101 is configured to identify another synchronization signal backwardly from the first synchronization signal block.

The first determination sub-module 1102 is configured to determine a second synchronization signal block when another synchronization signal is identified.

Figure 12:
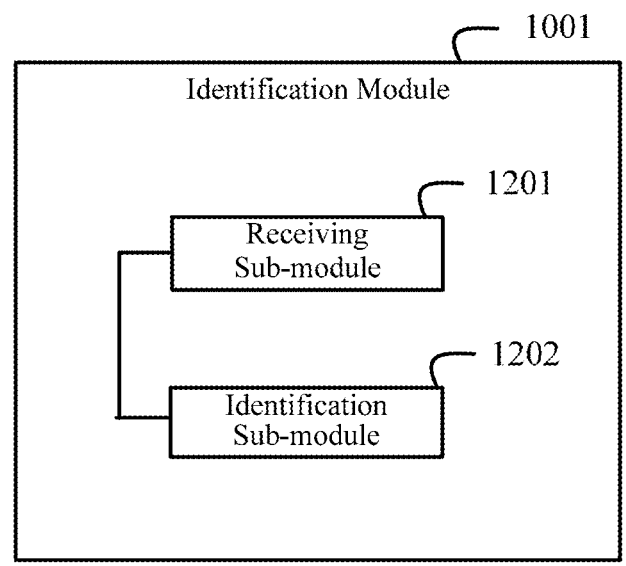
FIG. 12 is a block diagram of an identification module according to an exemplary embodiment.

In an embodiment, as illustrated in FIG. 12, the identification module 1001 comprises a receiving sub-module 1201 and an identification sub-module 1202.

The receiving sub-module 1201 is configured to receive and buffer subframes with a preset duration, which is less than one period.

The identification sub-module 1202 is configured to identify a synchronization signal forwardly from an end position of the last subframe that is buffered according to a preset position of the synchronization signal.

Figure 13:
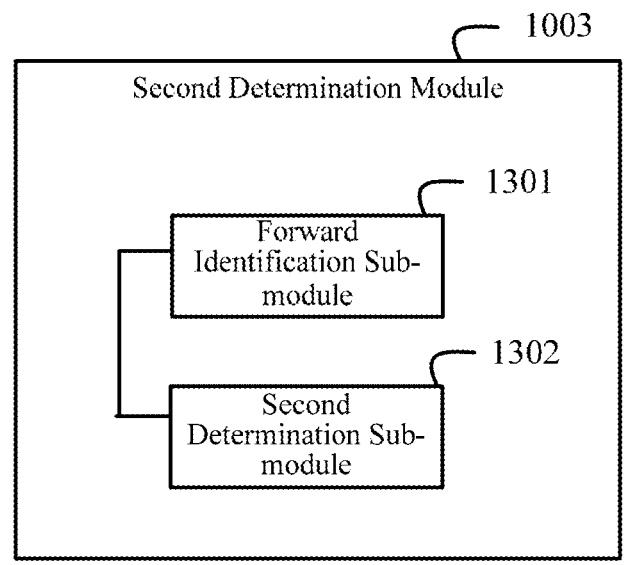
FIG. 13 is a block diagram of a second determination module according to an exemplary embodiment.

As illustrated in FIG. 13, the second determination module 1003 comprises a forward identification sub-module 1301 and a second determination sub-module 1302.

The forward identification sub-module 1301 is configured to identify another synchronization signal forwardly from the first synchronization signal block in the buffered subframes.

The second determination sub-module 1302 is configured to determine a second synchronization signal block when another synchronization signal is identified.

Figure 14:
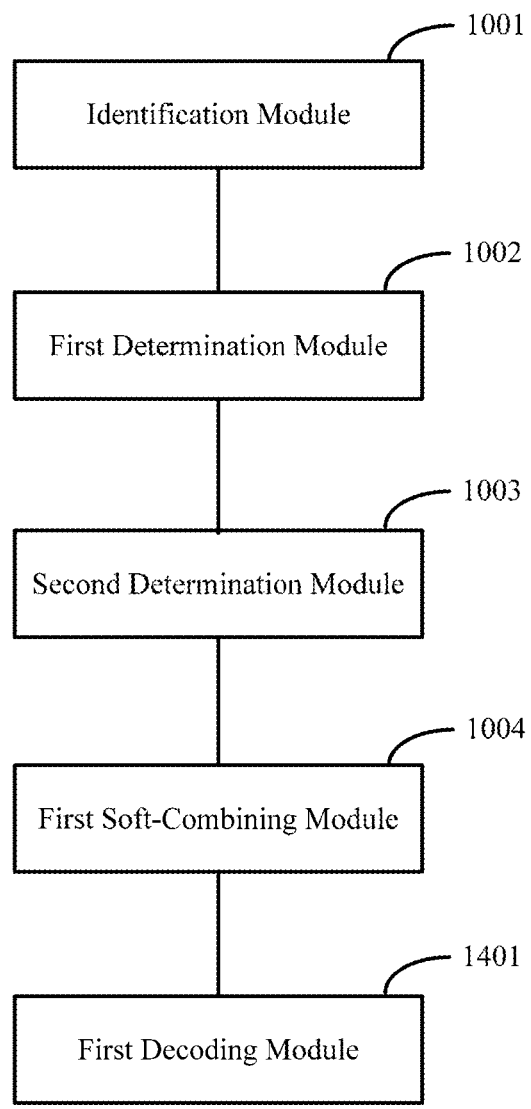
FIG. 14 is a block diagram of a device for processing a physical broadcast channel according to an exemplary embodiment.

In an embodiment, as illustrated in FIG. 14, the device further comprises a first decoding module 1401.

The first decoding module 1401 is configured to decode the soft-combined PBCHs.

Figure 15:
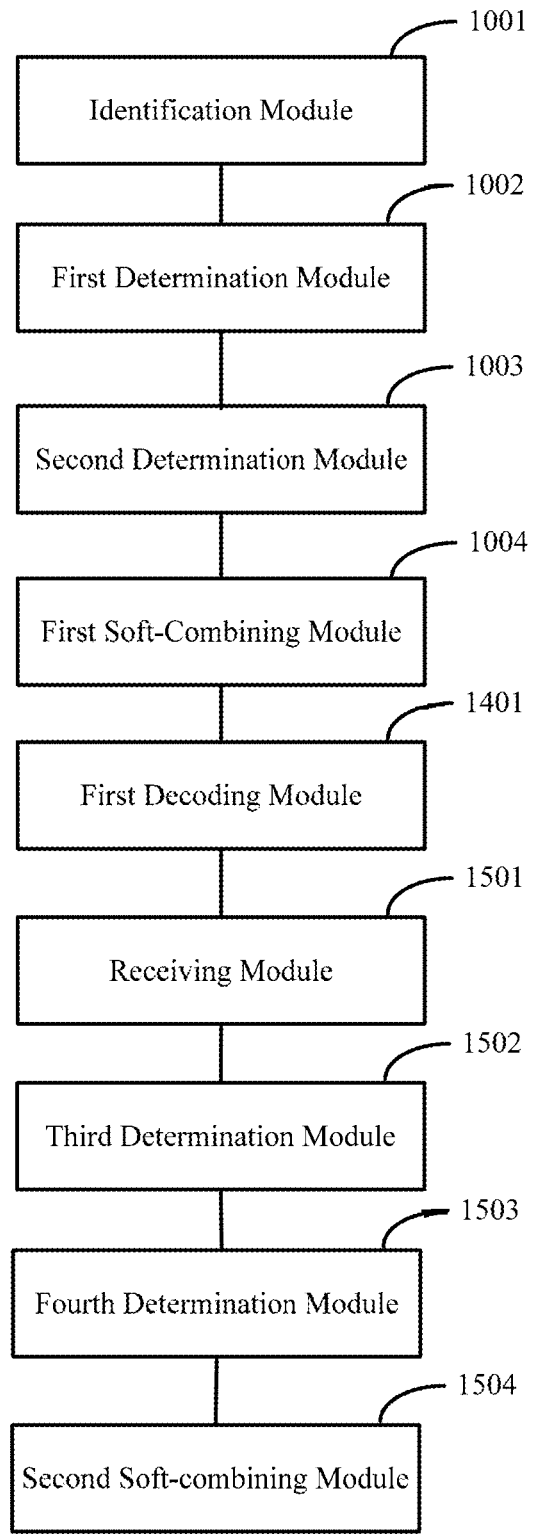
FIG. 15 is a block diagram of a device for processing a physical broadcast channel according to an exemplary embodiment.

In an embodiment, as illustrated in FIG. 15, the device further comprises a receiving module 1501, a third determination module 1502, a fourth determination module 1503 and a second soft-combining module 1504.

The receiving module 1501 is configured to receive and buffer subframes of one period starting from the first synchronization signal block, when decoding of the soft-combined PBCHs fails.

The third determination module 1502 is configured to determine a third synchronization signal block spaced apart from the first synchronization signal block by one period.

The fourth determination module 1503 is configured to, in the subframes of the period that is buffered, acquire a fourth synchronization signal block forwardly from the third synchronization signal block in a synchronization signal burst set to which the third synchronization signal block belongs.

The second soft-combining module 1504 is configured to soft-combine PBCHs in the third synchronization signal block and the fourth synchronization signal block.

Figure 16:
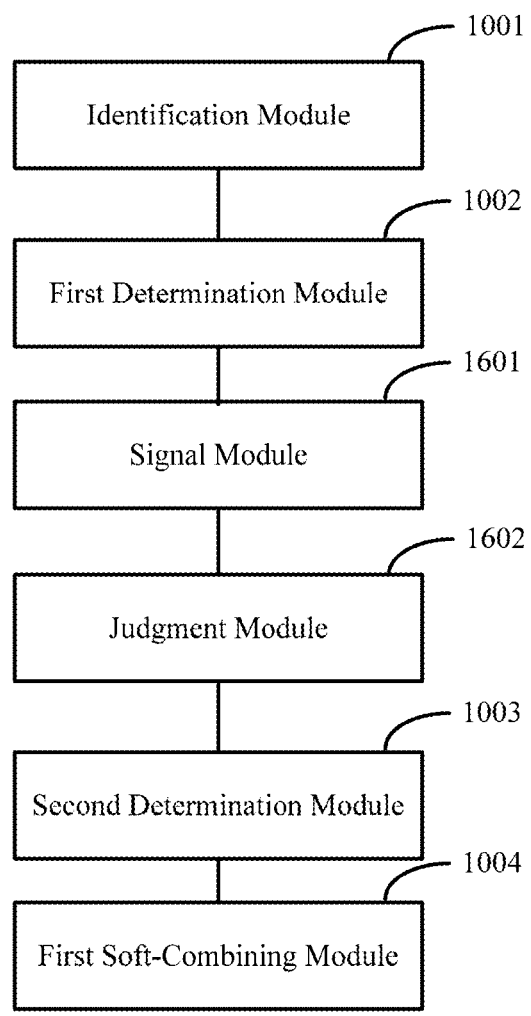
FIG. 16 is a block diagram of a device for processing a physical broadcast channel according to an exemplary embodiment.

In an embodiment, as illustrated in FIG. 16, the device further comprises a signal module 1601 and a judgement module 1602.

The signal module 1601 is configured to obtain current signal intensity.

The judgement module 1602 is configured to determine whether the signal intensity is greater than a preset signal intensity threshold.

Figure 17:
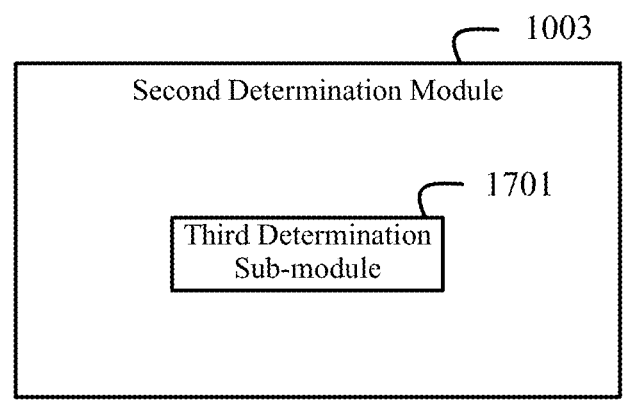
FIG. 17 is a block diagram of a second determination module according to an exemplary embodiment.

As illustrated in FIG. 17, the second determination module 1003 comprises a third determination sub-module 1701.

The third determination sub-module 1701 is configured to determine a second synchronization signal block, when the signal intensity is not greater than the preset signal intensity threshold and another synchronization signal is identified.

Figure 18:
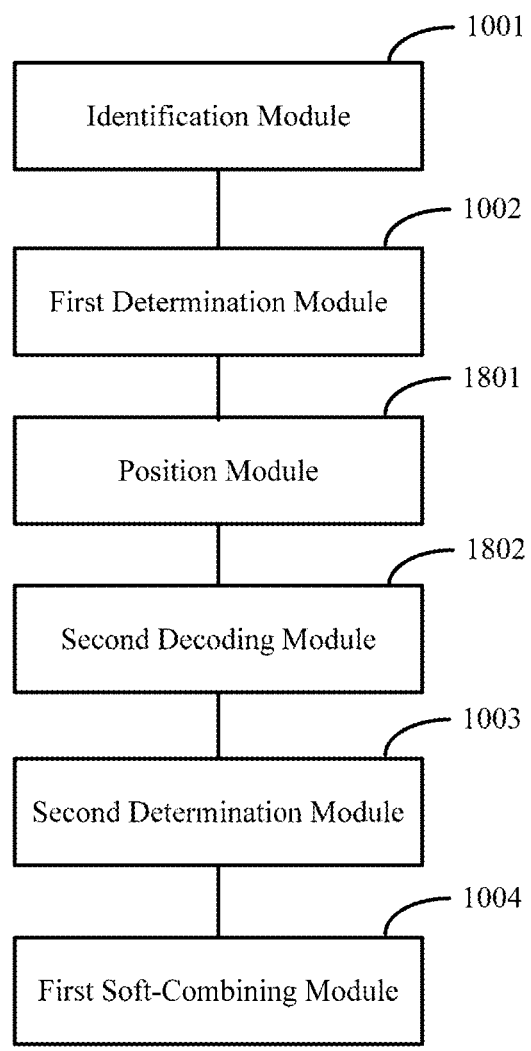
FIG. 18 is a block diagram of a device for processing a physical broadcast channel according to an exemplary embodiment.

In an embodiment, as illustrated in FIG. 18, the device further comprises a position module 1801 and a second decoding module 1802.

The position module 1801 is configured to determine a PBCH position in the first synchronization signal block according to a position of a synchronization signal in the first synchronization signal block and a preset relative position relationship between the PBCH and the synchronization signal.

The second decoding module 1802 is configured to decode the PBCH in the first synchronization signal block according to the PBCH position.

Figure 19:
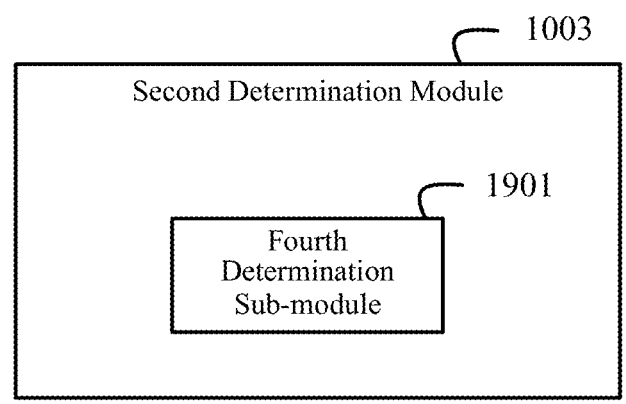
FIG. 19 is a block diagram of a second determination module according to an exemplary embodiment.

As illustrated in FIG. 19, the second determination module 1003 comprises a fourth determination sub-module 1901.

The fourth determination sub-module 1901 is configured to determine a second synchronization signal block, when decoding of the PBCH in the first synchronization signal block fails, and another synchronization signal is identified.

With respect to the devices in the above embodiments, the specific operating manners for individual modules have been described in detail in the method embodiments, which will not be elaborated herein.

Figure 20:
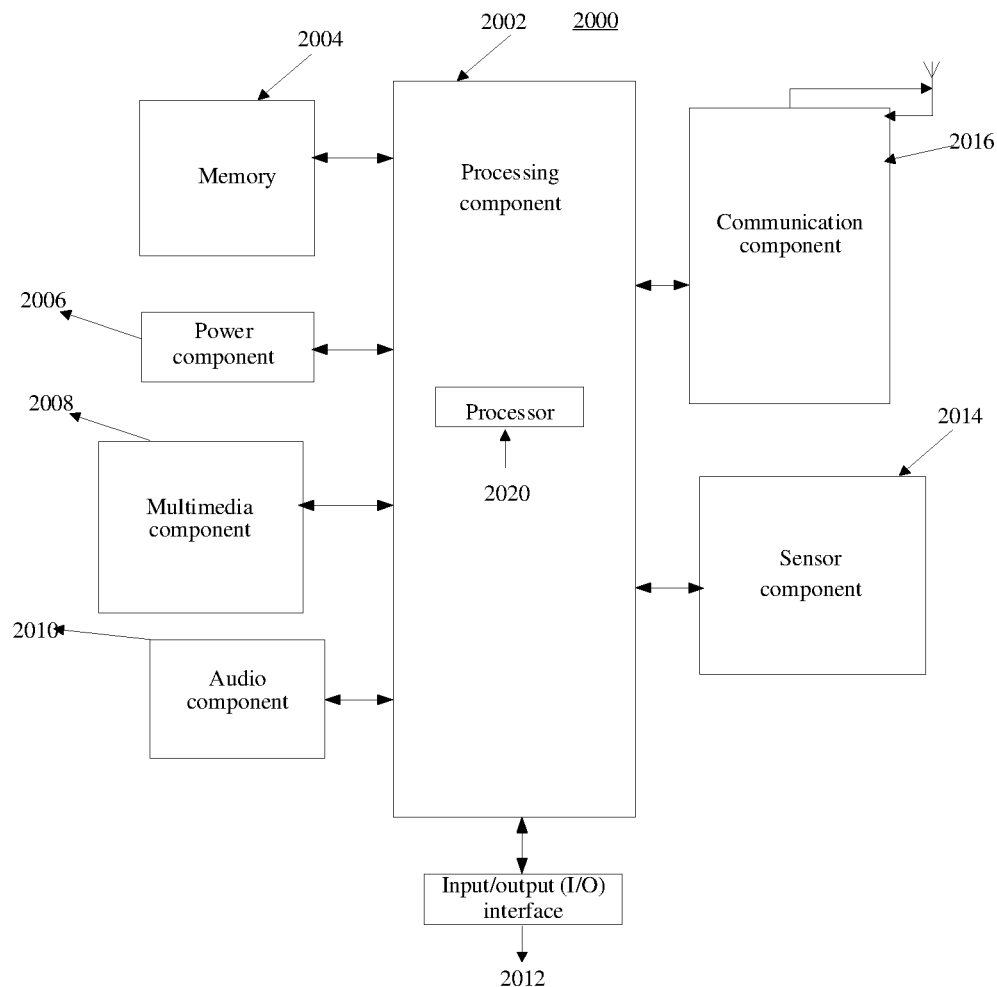
FIG. 20 is a block diagram of a device for processing a physical broadcast channel according to an exemplary embodiment.

FIG. 20 is a block diagram of a device for processing a physical broadcast channel according to an exemplary embodiment. For example, a device 2000 can be a mobile phone, a computer, a digital broadcast terminal, a messaging device, a gaming console, a tablet, a medical device, an exercise equipment, a personal digital assistant, and the like.

The device 2000 can comprise one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the device 2000, such as the operations associated with display, telephone calls, data communications, camera operations, and recording operations. The processing component 2002 can comprise one or more processors 2020 to execute instructions to perform all or part of the steps in the above described methods. Moreover, the processing component 2002 can comprise one or more modules which facilitate the interaction between the processing component 2002 and other components. For instance, the processing component 2002 can comprise a multimedia module to facilitate the interaction between the multimedia component 2008 and the processing component 2002.

The memory 2004 is configured to store various types of data to support the operation of the device 2000. Examples of such data comprise instructions for operating any applications or methods operated on the device 2000, contact data, phonebook data, messages, pictures, video, etc. The memory 2004 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the device 2000. The power component 2006 can comprise a power management system, one or more power sources, and any other components associated with the generation, management, and distribution of power for the device 2000.

The multimedia component 2008 comprises a screen providing an output interface between the device 2000 and the user. In some embodiments, the screen can comprise a liquid crystal display (LCD) and a touch panel (TP). If the screen comprises the touch panel, the screen can be implemented as a touch screen to receive input signals from the user. The touch panel comprises one or more touch sensors to sense touches, drawings, and gestures on the touch panel. The touch sensors may not only sense a boundary of a touch or drawing action, but also sense a duration and a pressure associated with the touch or drawing action. In some embodiments, the multimedia component 2008 comprises a front camera and/or a rear camera. The front camera and/and the rear camera can receive an external multimedia data while the device 2000 is in an operation mode, such as a photographing mode or a video mode. Each of the front camera and the rear camera can be a fixed optical lens system or have focus and optical zoom capability.

The audio component 2010 is configured to output and/or input audio signals. For example, the audio component 2010 comprises a microphone ("MIC") configured to receive an external audio signal when the device 2000 is in an operation mode, such as a call mode, a recording mode, and a voice recognition mode. The received audio signal can be further stored in the memory 2004 or transmitted via the communication component 2016. In some embodiments, the audio component 2010 further comprises a speaker to output audio signals.

The I/O interface 2012 provides an interface between the processing component 2002 and peripheral interface modules, such as a keyboard, a click wheel, a button, and the like. The button can comprise, but is not limited to, a home button, a volume button, a starting button, and a locking button.

The sensor component 2014 comprises one or more sensors to provide state assessments of various aspects of the device 2000. For instance, the sensor component 2014 can detect an on/off state of the device 2000, and relative positioning of components. For example, the components are the display and the keypad of the device 2000, a change in position of the device 2000 or a component of the device 2000, a presence or absence of user contact with the device 2000, an orientation or an acceleration/deceleration of the device 2000, and a change in temperature of the device 2000. The sensor component 2014 can comprise a proximity sensor configured to detect the presence of nearby objects without any physical contact. The sensor component 2014 can also comprise a light sensor, such as a CMOS or CCD image sensor, for use in imaging applications. In some embodiments, the sensor component 2014 can also comprise an accelerometer sensor, a gyroscope sensor, a magnetic sensor, a pressure sensor, or a temperature sensor.

The communication component 2016 is configured to facilitate wired or wireless communication between the device 2000 and other devices. The device 2000 can access a wireless network based on a communication standard, such as WiFi, 2G, or 3G, or a combination thereof. In one exemplary embodiment, the communication component 2016 receives a broadcast signal or broadcast associated information from an external broadcast management system via a broadcast channel In one exemplary embodiment, the communication component 2016 further comprises a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 2000 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium, such as a memory 2004 comprising instructions executable by the processor 2020 in the device 2000, for performing the above-described methods. For example, the non-transitory computer-readable storage medium can be a ROM, a random access memory (RAM), a CD-ROM, a magnetic tape, a floppy disc, an optical data storage device, and the like.

In an exemplary embodiment, there is provided a device for processing a physical broadcast channel, which comprises:
  a processor;
  a memory for storing instructions executable by the processor,
  wherein the processor is configured to:
  identify a synchronization signal from an obtained subframe according to a preset position of the synchronization signal;
  determine a first synchronization signal block when the synchronization signal is identified;
  determine a second synchronization signal block when another synchronization signal is identified in a synchronization signal burst set to which the first synchronization signal block belongs;
  soft-combine physical broadcast channels (PBCHs) in the first synchronization signal block and the second synchronization signal block.

The above-described processor can be further configured in such a manner that:
  determining a second synchronization signal block when another synchronization signal is identified comprises:
  identifying another synchronization signal backwardly from the first synchronization signal block; and
  determining a second synchronization signal block when another synchronization signal is identified.

The above-described processor is further configured in such a manner that:
  identifying a synchronization signal from an obtained subframe according to a preset position of the synchronization signal comprises:
  receiving and buffering subframes in a preset duration, which is less than one period;
  identifying a synchronization signal forwardly from an end position of the last subframe that is buffered according to a preset position of the synchronization signal; and
  determining a second synchronization signal block when another synchronization signal is identified comprises:
  identifying another synchronization signal forwardly from the first synchronization signal block in the buffered subframes; and
  determining a second synchronization signal block when another synchronization signal is identified.

The above-described processor is further configured in such a manner that:
  the method further comprises:
  decoding the soft-combined PBCHs.

The above-described processor is further configured in such a manner that:
  the method further comprises:
  receiving and buffering subframes of one period starting from the first synchronization signal block, when decoding of the soft-combined PBCHs fails;
  determining a third synchronization signal block spaced apart from the first synchronization signal block by one period;
  in the subframes of one period that is buffered, acquiring a fourth synchronization signal block forwardly from the third synchronization signal block in a synchronization signal burst set to which the third synchronization signal block belongs; and
  soft-combining PBCHs in the third synchronization signal block and the fourth synchronization signal block.

The above-described processor is further configured in such a manner that:
 prior to determining a second synchronization signal block when another synchronization signal is identified, the method further comprises:
 obtaining a current signal intensity;
 determining whether the signal intensity is greater than a preset signal intensity threshold; and
 determining a second synchronization signal block when another synchronization signal is identified comprises:
 determining a second synchronization signal block, when the signal intensity is not greater than the preset signal intensity threshold and another synchronization signal is identified.

The above-described processor is further configured to:
 prior to determining a second synchronization signal block when another synchronization signal is identified, the method further comprises:
 determining a PBCH position in the first synchronization signal block according to a position of a synchronization signal in the first synchronization signal block and a preset relative position relationship between the PBCH and the synchronization signal;
 decoding the PBCH in the first synchronization signal block according to the PBCH position; and
 determining a second synchronization signal block when another synchronization signal is identified comprises:
 determining a second synchronization signal block, when decoding of the PBCH in the first synchronization signal block fails, and another synchronization signal is identified.

A non-transitory computer-readable storage medium having instructions stored therein that, when executed by a processor of the device 2000, causes the device 2000 to perform a method for processing a physical broadcast channel, which comprises:
 identifying a synchronization signal from an obtained subframe according to a preset position of the synchronization signal;
 determining a first synchronization signal block when the synchronization signal is identified;
 determining a second synchronization signal block when another synchronization signal is identified in a synchronization signal burst set to which the first synchronization signal block belongs; and
 soft-combining physical broadcast channels (PBCHs) in the first synchronization signal block and the second synchronization signal block.

The instructions stored in the storage medium can further comprise:
 determining a second synchronization signal block when another synchronization signal is identified, which comprises:
 identifying another synchronization signal backwardly from the first synchronization signal block; and
 determining a second synchronization signal block when another synchronization signal is identified.

The instructions stored in the storage medium can further comprise:
 identifying a synchronization signal from an obtained subframe according to a preset position of the synchronization signal, which comprises:
 receiving and buffering subframes with a preset duration, which is less than one period;
 identifying a synchronization signal forwardly from an end position of the last subframe that is buffered according to a preset position of the synchronization signal; and
 determining a second synchronization signal block when another synchronization signal is identified, which comprises:
 identifying another synchronization signal forwardly from the first synchronization signal block in the buffered subframes; and
 determining a second synchronization signal block when another synchronization signal is identified.

The instructions in the storage medium can further comprise:
 the method, which further comprises:
 decoding the soft-combined PBCHs.

The instructions in the storage medium can further comprise:
 the method further comprising:
 receiving and buffering subframes of one period starting from the first synchronization signal block, when decoding of the soft-combined PBCHs fails;
 determining a third synchronization signal block spaced apart from the first synchronization signal block by one period;
 in the subframes of one period that is buffered, acquiring a fourth synchronization signal block forwardly from the third synchronization signal block in a synchronization signal burst set to which the third synchronization signal block belongs; and
 soft-combining PBCHs in the third synchronization signal block and the fourth synchronization signal block.

The instructions in the storage medium can further comprise:
 prior to determining a second synchronization signal block when another synchronization signal is identified, the method further comprises:
 obtaining a current signal intensity;
 determining whether the signal intensity is greater than a preset signal intensity threshold; and
 determining a second synchronization signal block when another synchronization signal is identified comprises:
 determining a second synchronization signal block, when the signal intensity is not greater than the preset signal intensity threshold and another synchronization signal is identified.

The instructions in the storage medium can further comprise:
 prior to determining a second synchronization signal block when another synchronization signal is identified, the method further comprises:
 determining a PBCH position in the first synchronization signal block according to a position of a synchronization signal in the first synchronization signal block and a preset relative position relationship between the PBCH and the synchronization signal;
 decoding the PBCH in the first synchronization signal block according to the PBCH position; and
 determining a second synchronization signal block when another synchronization signal is identified comprises:
 determining a second synchronization signal block, when decoding of the PBCH in the first synchronization signal block fails, and another synchronization signal is identified.

Other embodiments of the disclosure will be apparent to those skilled in the art from consideration of the specification and practice of the disclosure disclosed herein. This application is intended to cover any variations, uses, or adaptations of the disclosure following the general principles thereof and comprising well-known knowledge and commonly used technical means in the art which are not described herein. It is intended that the specification and examples be considered as exemplary only, with a true scope and spirit of the disclosure being set forth by the following claims.

It will be appreciated that the present disclosure is not limited to the exact construction that has been described above and illustrated in the accompanying drawings, and that various modifications and variations can be made without departing from the scope thereof. It is intended that the scope of the disclosure only be limited by the appended claims.

What is claimed is:

1. A method for processing a physical broadcast channel, comprising:
   identifying a first synchronization signal from an obtained subframe according to a preset position of the first synchronization signal;
   determining a first synchronization signal block when the first synchronization signal is identified;
   obtaining a current signal intensity;
   determining whether the signal intensity is greater than a preset signal intensity threshold;
   determining that a success rate of physical broadcast channel (PBCH) decoding is low when the signal intensity is not greater than the preset signal intensity threshold;
   after determining that the success rate of the PBCH decoding is low, identifying a second synchronization signal in a first order from the first synchronization signal block in a synchronization signal burst set to which the first synchronization signal block belongs;
   determining a second synchronization signal block when the second synchronization signal is identified, the determined second synchronization signal block being at a position of a third symbol that is after a fourth symbol where the first synchronization signal block is;
   soft-combining physical broadcast channels (PBCHs) in the first synchronization signal block and the second synchronization signal block;
   decoding the soft-combined PBCHs;
   receiving and buffering subframes in one period starting from the first synchronization signal block, when decoding of the soft-combined PBCHs fails;
   determining a third synchronization signal block spaced apart from the first synchronization signal block by one period;
   in the subframes of one period that is buffered, acquiring a fourth synchronization signal block in a second order from the third synchronization signal block in a synchronization signal burst set to which the third synchronization signal block belongs, the acquired fourth synchronization signal block being at a position of a first symbol that is before a second symbol where the third synchronization signal block is; and
   soft-combining PBCHs in the third synchronization signal block and the fourth synchronization signal block.

2. The method of claim 1, wherein prior to determining the second synchronization signal block when the second synchronization signal is identified, the method further comprises:
   determining a PBCH position in the first synchronization signal block according to a position of synchronization signal in the first synchronization signal block and a preset relative position relationship between the PBCH and the synchronization signal;
   decoding the PBCH in the first synchronization signal block according to the PBCH position; and
   determining the second synchronization signal block when the second synchronization signal is identified comprises:
   determining the second synchronization signal block, when decoding of the PBCH in the first synchronization signal block fails and the second synchronization signal is identified.

3. A device for processing a physical broadcast channel, comprising:
   a processor;
   a memory configured to store instructions executable by the processor,
   wherein the processor is configured to:
   identify a first synchronization signal from an obtained subframe according to a preset position of the first synchronization signal;
   determine a first synchronization signal block when the first synchronization signal is identified;
   obtain a current signal intensity;
   determine whether the signal intensity is greater than a preset signal intensity threshold;
   determine that a success rate of physical broadcast channel (PBCH) decoding is low when the signal intensity is not greater than the preset signal intensity threshold;
   after determining that the success rate of the PBCH decoding is low, identify a second synchronization signal in a first order from the first synchronization signal block in a synchronization signal burst set to which the first synchronization signal block belongs;
   determine a second synchronization signal block when the second synchronization signal is identified, the determined second synchronization signal block being at a position of a third symbol that is after a fourth symbol where the first synchronization signal block is;
   soft-combine physical broadcast channels (PBCHs) in the first synchronization signal block and the second synchronization signal block;
   decode the soft-combined PBCHs;
   receive and buffer subframes in one period starting from the first synchronization signal block, when decoding of the soft-combined PBCHs fails;
   determine a third synchronization signal block spaced apart from the first synchronization signal block by one period;
   in the subframes of one period that is buffered, acquire a fourth synchronization signal block in a second order from the third synchronization signal block in a synchronization signal burst set to which the third synchronization signal block belongs, the acquired fourth synchronization signal block being at a position of a first symbol that is before a second symbol where the third synchronization signal block is; and
   soft-combine PBCHs in the third synchronization signal block and the fourth synchronization signal block.

4. The device of claim 3, wherein prior to determining the second synchronization signal block when the second synchronization signal is identified, the processor is further configured to:
   determine a PBCH position in the first synchronization signal block according to a position of synchronization signal in the first synchronization signal block and a preset relative position relationship between the PBCH and the synchronization signal; and decode the PBCH in the first synchronization signal block according to the PBCH position; and in determining the second synchronization signal block when the second synchronization signal is identified, the processor is further configured to:

determine the second synchronization signal block, when decoding of the PBCH in the first synchronization signal block fails and the second synchronization signal is identified.

* * * * *